US012231039B2

(12) United States Patent
Jiang et al.

(10) Patent No.: US 12,231,039 B2
(45) Date of Patent: Feb. 18, 2025

(54) ENHANCED HYBRID HYSTERETIC CONTROL OF LLC CONVERTERS

(71) Applicant: TEXAS INSTRUMENTS INCORPORATED, Dallas, TX (US)

(72) Inventors: Chen Jiang, Houston, TX (US); Zhenyu Yu, Sugar Land, TX (US); Longqi Li, Shenzhen (CN); Desheng Guo, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 146 days.

(21) Appl. No.: 18/066,781

(22) Filed: Dec. 15, 2022

(65) Prior Publication Data

US 2024/0204644 A1   Jun. 20, 2024

(51) Int. Cl.
*H02M 3/335* (2006.01)
*H02M 1/00* (2006.01)
*H02M 3/00* (2006.01)

(52) U.S. Cl.
CPC ........... *H02M 3/01* (2021.05); *H02M 1/0022* (2021.05); *H02M 3/33571* (2021.05); *H02M 1/0009* (2021.05)

(58) Field of Classification Search
CPC ...................................................... H02M 3/01
See application file for complete search history.

(56) References Cited

U.S. PATENT DOCUMENTS

| | | | |
|---|---|---|---|
| 11,005,363 B1* | 5/2021 | Wongsasulux ...... | H02M 1/0009 |
| 2016/0190945 A1* | 6/2016 | Liu ..................... | H02M 3/3376 363/21.02 |
| 2021/0391800 A1* | 12/2021 | Jiang .................. | H02M 1/0022 |
| 2023/0088584 A1* | 3/2023 | Panov ................ | H02M 1/0019 323/271 |

* cited by examiner

*Primary Examiner* — Alex Torres-Rivera
(74) *Attorney, Agent, or Firm* — Xianghui Huang; Frank D. Cimino

(57) ABSTRACT

A power converter includes a power converter circuit and a microcontroller that controls the power converter circuit. The microcontroller includes a power control unit and a processing unit. The power control unit adjusts the switching frequency of the power converter circuit based on thresholds of a resonant capacitor of the power converter circuit. The power control unit also generates event signals indicative of breaches of the thresholds by the resonant capacitor. When the processing unit receives an event signal from the power control unit indicative of a breach of one of the thresholds by the resonant capacitor, the processing unit determines whether the switching frequency falls outside a defined range based on the event signal. In response to determining that the switching frequency falls outside the defined range, the processing unit instructs the power control unit to clamp the switching frequency of the power converter circuit.

20 Claims, 8 Drawing Sheets

ENHANCED HYBRID HYSTERETIC CONTROL OF LLC CONVERTERS

TECHNICAL FIELD

Aspects of the disclosure are related to the field of power converters and, in particular, to hybrid hysteretic controlled (HHC) inductor-inductor-capacitor (LLC) converters.

BACKGROUND

An Inductor-Inductor-Capacitor (LLC) converter is a DC-DC power converter that is based on a resonant circuit. LLC converters are designed to output a desired voltage based on changes in the load, where the behavior of the output voltage is known as the transient response. In applications with fast load changes, a high transient response is required to efficiently keep the output voltage stable within a desired range. For example, in an LLC converter, when the load changes, the output voltage reacts accordingly.

In order to control load fluctuations, LLC converters are designed to return the output voltage to a predefined steady-state voltage. Conventional techniques to control the transient response of an LLC converter rely on Direct Frequency Control (DFC). DFC LLC converters control the switching frequency of gate elements directly via a closed loop voltage system to achieve the desired output voltage of the system. However, this technique generates a poor transient response as the technique offers limited bandwidth.

Hybrid hysteretic controlled (HHC) LLC converters improve the transient response of the system by utilizing a combination of charge control and slope compensation to produce a high transient response. A control loop in the HHC LLC converter observes the voltage across the resonant capacitor of the converter and compares the voltage to identified voltage thresholds. When the observed voltage breaches the thresholds, the control loop adjusts the switching frequency of the gates accordingly to keep the output voltage within a desired range.

In applications, such as server power, telecom rectifiers, or the like, a faster transient response is desired, due to their fast-changing load requirements and associated fluctuations. Problematically, the fluctuations driven by new loads can be so severe that the switching frequencies needed to respond to the fluctuations exceed the capacity of the gate elements and/or destabilize the overall system.

SUMMARY

Enhanced hybrid hysteretic control technology is disclosed herein that improves the transient response of LLC power converters. In one implementation, a power converter includes a power converter circuit and a microcontroller that controls the power converter circuit. The microcontroller includes a power control unit and a processing unit. The power control unit controls a switching frequency of the power converter circuit in order to influence the transient response of the power converter circuit. The processing unit is coupled to the power control unit and delivers instructions to the power control unit to affect its control of the switching frequency of the power converter circuit.

In an implementation, the power control unit adjusts the switching frequency of the power converter circuit based on thresholds of a resonant capacitor of the power converter circuit. The power control unit also generates event signals indicative of breaches of the thresholds by the resonant capacitor. When the processing unit receives an event signal from the power control unit indicative of a breach of one of the thresholds by the resonant capacitor, the processing unit determines whether the switching frequency falls outside a defined range based on the event signal. In response to determining that the switching frequency falls outside the defined range, the processing unit instructs the power control unit to clamp the switching frequency of the power converter circuit.

This Summary is provided to introduce a selection of concepts in a simplified form that are further described below in the Technical Disclosure. It may be understood that this Summary is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Figure 1A:
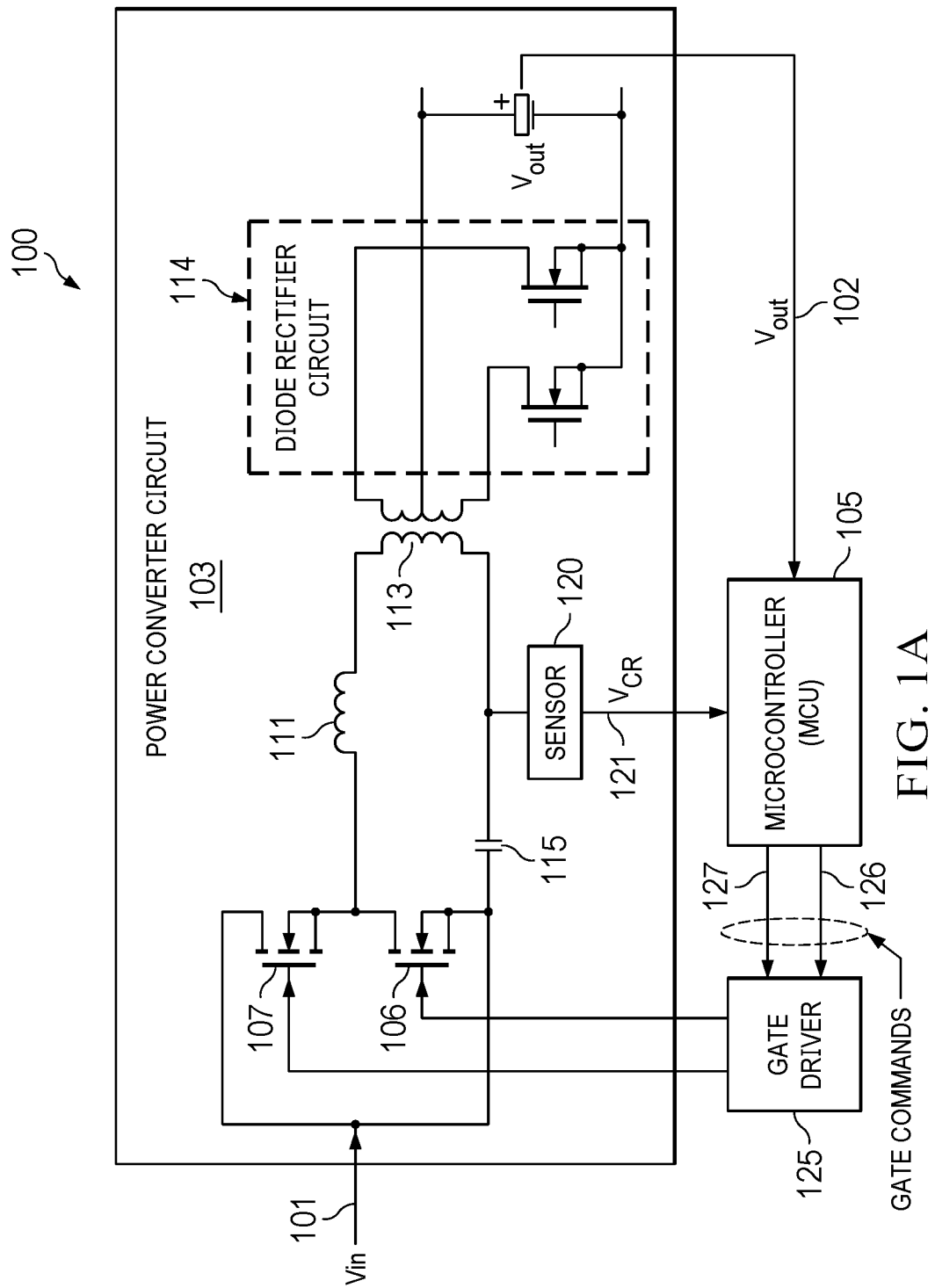
FIG. 1A illustrates a system architecture in an implementation with respect to a Hybrid hysteretic controlled (HHC) Inductor-Inductor-Capacitor (LLC) converter.

Various implementations are disclosed herein that describe enhanced hybrid hysteretic control (HHC) of Inductor-Inductor-Capacitor (LLC) converters. In various implementations, the performance of LLC converters is improved by clamping the switching frequencies of gate elements at the high and low ends of a defined range of frequencies. High-side clamping reduces switching loss under light load conditions, while low-side clamping prevents an LLC converter from entering a capacitive mode of operation.

In one implementation, a power converter includes a power converter circuit and a microcontroller that controls the circuit. The microcontroller includes a power control unit and a processing unit. The power converter circuit is capable of operating in a normal mode, a maximum frequency clamping mode, and a minimum frequency clamping mode. The mode of operation is determined by a control program executed by the processing unit of the microcontroller. The processing unit is coupled to the power control unit. The power control unit controls the power converter circuit in accordance with the mode determined by the processing unit.

When in the normal operating mode, the power control unit responds to load fluctuations by determining the frequency at which high-side and gates of the power converter circuit are turned on and off. Load fluctuations may occur when, for example, servers, switches, or other such equipment are turned on or off rapidly to meet demand. The power control unit also communicates with a gate driver of the power converter circuit to turn the gates on and off at the determined frequency. Turning the gates on and off at specific frequencies serves to modulate the gain of the power converter circuit to achieve a desired output voltage. However, in both the maximum clamping mode and the minimum clamping mode, the processing unit overrides the power control unit's determinations. Rather than allowing the gates to be driven at a frequency determined by the power control unit, the processing unit signals the power control unit to clamp the switching frequency at a minimum or maximum frequency of a defined range—depending upon the nature of the load fluctuations.

For example, a drop in current load caused by a reduction in demand may cause a spike in output voltage. This spike in output voltage results from voltage and current having an inverse relationship (e.g., voltage increases when current decreases). For instance, rapid drop in demand caused by servers shutting down causes a drop in current load and a spike in output voltage. The power control unit responds to the spike in output voltage by increasing the switching frequency of the gate elements of the power converter circuit. The processing unit effectively monitors the switching frequency of the power converter and, if the switching frequency exceeds an upper limit, the processing unit clamps the switching frequency so that the switching frequency cannot increase any further, thereby avoiding or mitigating switching loss.

In another example, a surge in current load may cause a drop in output voltage. Current load may surge when, for example, servers are turned on in a rapid fashion, which causes a corresponding drop in output voltage. The power control unit responds to the drop in output voltage by decreasing the switching frequency of one or more gate elements of the power converter circuit. The processing unit sees the decreased switching frequency and, if the switching frequency becomes too low, the processing unit clamps the switching frequency so that the switching frequency cannot decrease any further, thereby preventing the power converter from entering a capacitive state.

More broadly, the processing unit provides a compensation value to the power control unit that is used to derive voltage thresholds. The power control unit employs the voltage thresholds with respect to a voltage sensed at a resonant capacitor of the power converter circuit. The power control unit monitors for breaches of the thresholds by the voltage of the resonant capacitor. When the resonant capacitor voltage exceeds an upper threshold or falls below a lower threshold, the power control unit responds to the threshold breach by adjusting the switching frequency of gate elements of the power converter circuit. The power control unit also signals to the processing unit that the threshold breach occurred.

The processing unit responds to the threshold breach by determining whether to transition the power control unit to one of either the maximum clamping mode or the minimum clamping mode. In some examples, the processing unit makes this determination based on one or more counter values maintained by the power control unit that are indicative of the switching frequency of the gate elements of the power converter circuit. The processing unit need not take any action if the power control unit is to remain in normal mode. However, if the power control unit needs to transition to either one of the clamping modes, the processing unit signals as such to the power control unit so that the switching frequency can be clamped accordingly.

FIG. 1A illustrates an HHC LLC converter in an implementation, herein referred to as power converter 100. Power converter 100 includes power converter circuit 103, microcontroller unit (MCU) 105, and gate driver 125. Power converter circuit 103 is configured to convert an input voltage to a desired output voltage. For example, power converter circuit 103 steps up or steps down a DC input voltage to achieve the desired DC output. However, the input voltage can fluctuate—sometimes drastically.

MCU 105 controls power converter circuit 103 via gate commands sent to gate driver 125 to adjust up or down the switching frequency of gate elements of converter circuit 103, thereby keeping the output voltage within an acceptable range. Power converter circuit 103 includes gate elements represented by gate 106 and gate 107 driven by gate driver 125. Gate 106 is a transistor that functions as a low-side filter, while gate 107 is a transistor that functions as a high-side filter. Power converter circuit 103 also includes resonant inductor 111, transformer 113, resonant capacitor 115, sensor 120, and diode rectifier circuit 114.

Figure 5:
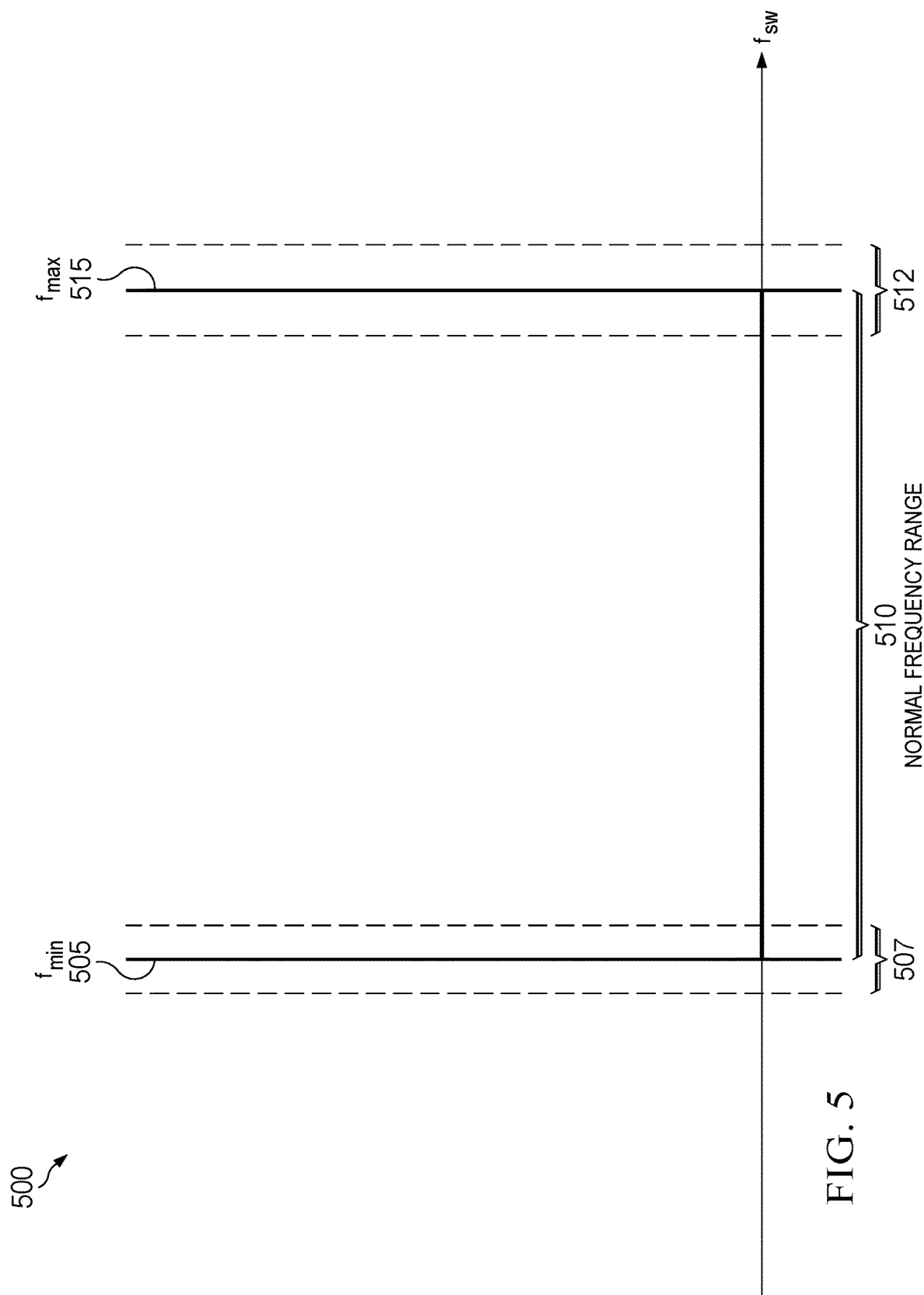
FIG. 5 illustrates a graph that describes operating regions in an implementation with respect to an HHC LLC converter.

Referring ahead briefly to FIG. 5, graph 500 illustrates a normal operating range 510 of the switching frequency of power converter circuit 103. Normal operating range 510 extends from minimum frequency 505 to maximum frequency 515. Power converter circuit 103 functions properly while the switching frequency of gates 106 and 107 remain within normal operating range 510. However, switching loss may occur when the switching frequency increases beyond maximum frequency 515, while power converter circuit 103 may enter a capacitive mode of operation when the switching frequency falls below minimum frequency 505.

The specific values of minimum frequency 505 and maximum frequency 515 depend upon the design of power converter circuit 103 and in particular, to characteristics of gates 106 and 107. In any case, it is desirable to keep the switching frequency of gates 106 and 107 within the normal operating range 510 and, if load fluctuations cause the switching frequency to move outside of the normal range, to clamp the switching frequency at or around the minimum and maximum frequencies. To that end, and as disclosed below, MCU 105 monitors the switching frequency of power converter circuit 103 and clamps the switching frequency when appropriate.

In particular, when the switching frequency of power converter circuit 103 falls within the normal operating range 510, MCU 105 operates in normal mode with respect to its control of power converter circuit 103. However, when the switching frequency of power converter circuit 103 exceeds maximum frequency 515, MCU 105 transitions to a maximum clamping mode of operation with respect to its control of power converter circuit 103. Likewise, when the switching frequency of power converter circuit 103 falls below minimum frequency 505, MCU 105 transitions to a minimum clamping mode of operation with respect to its control of power converter circuit 103. Hysteresis region 507 and hysteresis region 512 are provided to allow some give in the mode determinations made by MCU 105, so as to avoid thrashing between modes around minimum frequency 505 and maximum frequency 515 respectively.

Referring back to FIG. 1A, MCU 105 is operatively coupled to power converter circuit 103 and gate driver 125 such that MCU 105 is able to obtain voltage readings from power converter circuit 103 and instruct gate driver 125. For example, MCU 105 obtains $V_{CR}$ 121 from sensor 120. $V_{CR}$ 121 is a value that represents the voltage measured across resonant capacitor 115. When collected over a period of time, $V_{CR}$ 121 forms a sinusoidal wave. MCU 105 also obtains $V_{out}$ 102 from power converter circuit 103. $V_{out}$ 102 is a value that represents the voltage produced by power converter circuit 103. Generally speaking. MCU 105 instructs gate driver 125 based on $V_{CR}$ 121, in order to control $V_{out}$ 102.

More specifically, power converter circuit 103 is supplied input voltage $V_{in}$ 101 from a source (e.g., AC-DC converter, DC-DC converter, or other practical applications) and delivers $V_{in}$ 101 to gate 106 and gate 107. Gates 106 and 107 filter $V_{in}$ 101 to generate a square wave that is delivered to the resonant components of power converter circuit 103. Resonant inductor 111, transformer 113, and resonant capacitor 115 smooth the square wave, producing a sinusoidal voltage. The sinusoidal wave is delivered to diode rectifier circuit 114 of power converter circuit 103 to output the desired DC voltage.

MCU 105 controls the switching frequency of power converter circuit 103 via gate driver 125. MCU 105 is operatively coupled with gate driver 125 such that MCU 105 sends gate commands to gate driver 125 to control the frequency at which gates 106 and 107 are turned on and off, which is the switching frequency of power converter circuit 103. MCU 105 may control the switching frequency by sending on/off gate commands to gate driver 125 at a particular frequency such that the gate driver 125 drives gate 106 and gate 107 at the same frequency. Alternatively, MCU 105 may control the switching frequency of the gates by indicating to gate driver 125 a specific frequency at which the gate elements turn on and off.

MCU 105 controls gate 106 via gate command 126 and gate 107 via gate command 127. MCU 105 adjusts the switching frequencies of the gates up or down within a range of switching frequencies in response to fluctuations of the input voltage via gate commands 126 and 127. However, if the switching frequencies fall outside the range of switching frequencies, MCU 105 clamps the switching frequencies to a minimum or maximum defined switching frequency, depending on the fluctuations of the input voltage.

Figure 1B:
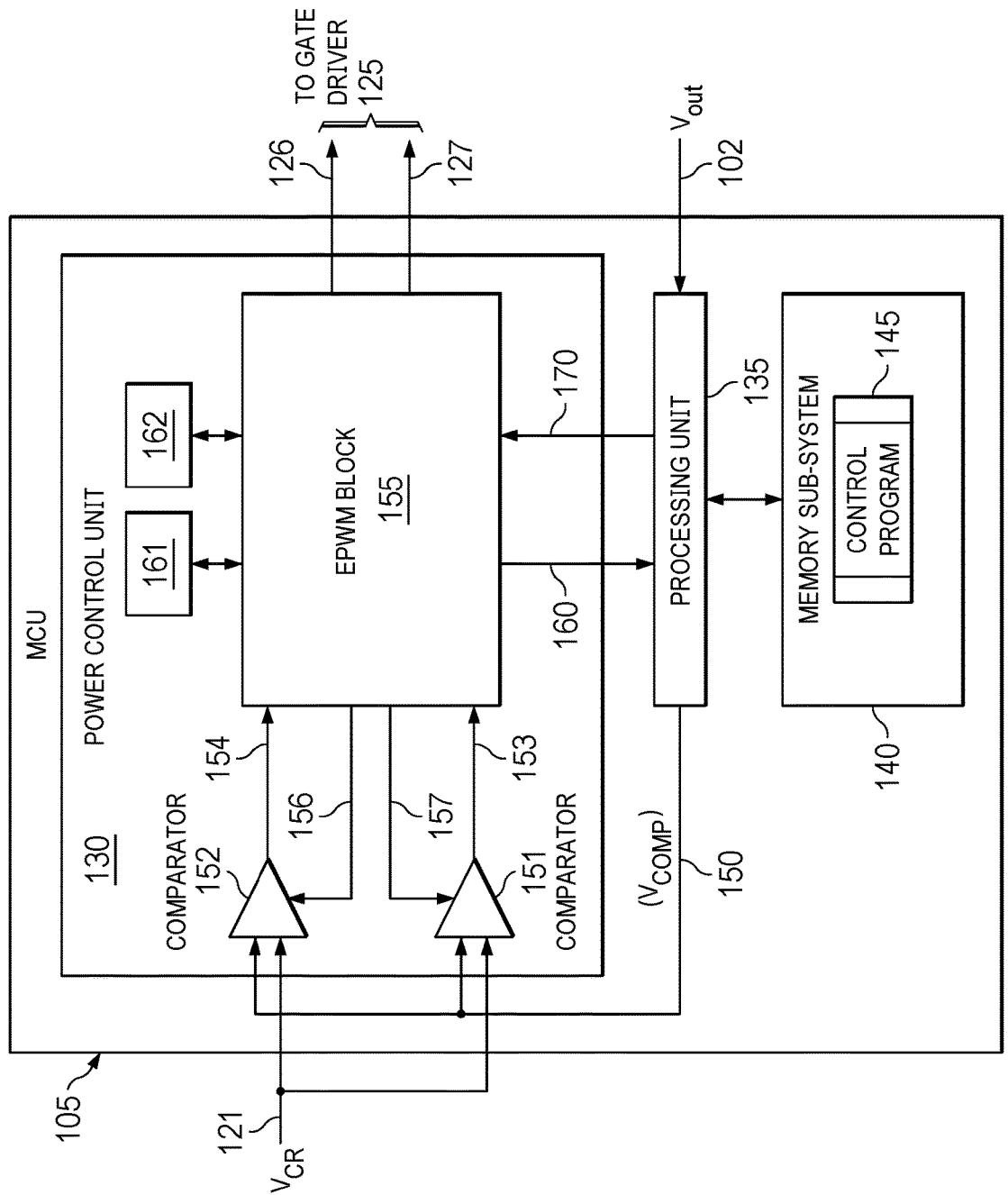
FIG. 1B illustrates a microcontroller unit (MCU) in an implementation.

FIG. 1B illustrates a block diagram of MCU 105 of FIG. 1A. MCU 105 includes power control unit 130, processing unit 135, and memory sub-system 140. Power control unit 130 is representative of a control loop that monitors and responds to fluctuations of the input voltage $V_{in}$ 101 across power converter circuit 103. Processing unit 135 is operatively coupled with memory sub-system 140 and power control unit 130. Processing unit 135 loads and executes software from memory sub-system 140 to determine the operating mode of power control unit 130.

Power control unit 130 includes comparator 151, comparator 152, enhanced pulse width modulation (EPWM) block 155, counter 161, and counter 162. Power control unit 130 is operatively coupled with processing unit 135 and manages the transient response by power converter circuit 103 to load fluctuations by adjusting the switching frequency of power converter circuit 103. That is, power control unit 130 sends gate command 126 and gate command 127 to gate driver 125 to adjust the switching frequencies of gate 106 and gate 107 respectively in order to respond to load fluctuations.

As described with regard to FIG. 1A, gate driver 125 generates gate signals for the respective gates based on gate command 126 and gate command 127 such that the gate signals turn the gates on and off at particular frequencies. In a normal operating mode, power control unit 130 responds to voltage increases or decreases caused by load fluctuations by increasing or decreasing the switching frequency of power converter circuit 103 within a defined range. For example, power control unit 130 responds to an increase in voltage caused by a reduction in load by increasing the switching frequency of power converter circuit 103. Inversely, power control unit 130 responds to a decrease in voltage caused by an increase in load by reducing the switching frequency of power converter circuit 103.

Processing unit 135 monitors the switching frequency of power converter circuit 103 to ensure that the frequency stays within a defined range. However, when load conditions drive the switching frequency outside of the defined range, processing unit 135 intervenes by instructing power control unit 130 to clamp the switching frequency at a maximum frequency value or a minimum frequency value—depending upon the conditions. For example, when the switching frequency exceeds an upper limit of the defined range, processing unit 135 instructs power control unit 130 to clamp the switching frequency at the maximum value. When the switching frequency falls below a lower limit of the defined range, processing unit 135 instructs power control unit 130 to clamp the frequency at a minimum value. Power control unit 130 achieves the clamping by outputting gate commands 126 and 127 as the determined frequency. By clamping either gate 106 to a minimum switching frequency or gate 107 to a maximum switching frequency, processing unit 135 can efficiently maintain the output voltage within a certain range.

More specifically, processing unit 135 receives $V_{out}$ 102—a value representative of the real-time output voltage produced by power converter circuit 103—and generates a compensation value ($V_{COMP}$ 150) based on $V_{out}$ 102. Processing unit 135 supplies $V_{COMP}$ 150 to comparators 151 and 152 of power control unit 130. Comparators 151 and 152 derive low-side and high-side voltage thresholds (VTL and VTH, respectively) based on $V_{COMP}$ 150. VTL and VTH are ramp signals with preset slopes that represent thresholds used by comparators 151 and 152 to evaluate the voltage across resonant capacitor 115. VTL may initially equal common mode voltage (e.g., $V_{CR}$) at sensor 120 less one-half of $V_{COMP}$ 150, while VTH may initially equal the common mode voltage plus one-half of $V_{COMP}$ 150.

Comparator 151 synchronizes VTL with a sync signal 157 produced by EPWM block 155 and compares $V_{CR}$ 121 to VTL to generate difference signal 153. Difference signal 153, which represents the difference between VTL and $V_{CR}$ 121, is fed to EPWM block 155. Similarly, comparator 152 synchronizes VTH with a sync signal 156 produced by EPWM block and compares $V_{CR}$ 121 to VTH to generate difference signal 154. (Comparator 152 may shift $V_{CR}$ 121 by 180 degrees prior to comparing it to VTH.) Difference signal 154, which represents the difference between VTH and $V_{CR}$ 121, is also fed to EPWM block 155.

EPWM block 155 uses the difference signals 154 and 153 to determine whether $V_{CR}$ 121 has breached either threshold VTL or VTH. When $V_{CR}$ 121 breaches VTH, EPWM block 155 determines to turn off gate 107 and turn on gate 106. When $V_{CR}$ 121 falls below VTL, EPWM block 155 determines to turn off gate 106 and turn on gate 107. EPWM block 155 sends gate commands 126 and 127 to gate driver 125 to turn the gates on and off, and increments counters 161 and 162. Counter 161 represents a time elapsed since the last breach of VTH by $V_{CR}$ 121, while counter 162 represents a time elapsed since the last breach of VTL $V_{CR}$ 121. In addition, EPWM block 155 sends an event signal 160 to processing unit 135 indicating that a breach has occurred.

It may be appreciated that the frequency at which gates 106 and 107 are turned on and off by EPWM block 155 is related to frequency shifts in difference signals 153 and 154. The frequency shifts in difference signals 153 and 154 are caused by changes VTH and VTL. Essentially, a change in $V_{out}$ 102 causes a change in $V_{COMP}$ 150, which causes the ramp signals represented by VTH and VTL to change. $V_{CR}$ 121 may then breach VTH and VTL sooner (or later) than it otherwise would have had the ramp signals represented by VTH and VTL not changed. Difference signals 153 and 154 reflect the change in the periodicity of breaches by $V_{CR}$ 121, which changes the frequency of on/off commands sent by EPWM block 155 to gate driver 125.

As mentioned, processing unit 135 allows EPWM block 155 to adjust the switching frequencies of gates 106 and 107 within a defined range to mitigate the fluctuations of $V_{in}$ 101. However, when the fluctuations of $V_{in}$ 101 would otherwise result in switching frequencies outside the defined range of switching frequencies, processing unit 135 interrupts power control unit 130 via control signal 170. Control signal 170 directs EPWM block 155 to clamp the switching frequencies at either the low-end or the high-end, depending upon the nature of the voltage fluctuations. In effect, EPWM block 155 ceases to drive the on/off commands based on difference signals 153 and 154, and instead locks them at a maximum or minimum frequency.

In order to determine when to interrupt power control unit 130, processing unit 135 employs control program 145. Control program 145 is stored in memory sub-system 140 includes program instructions executed by processing unit 135 to perform a control processes, of which control process 200 in FIG. 2 and interrupt service routine 300 in FIG. 3 are representative. Processing unit 135 is representative of a general-purpose microprocessor operatively coupled with memory sub-system 140 and capable of executing program instructions. When executed by processing unit 135, control program 145 directs MCU 105 to operate as described with respect to control process 200 illustrated in FIG. 2 and interrupt service routine 300 in FIG. 3.

Figure 2:
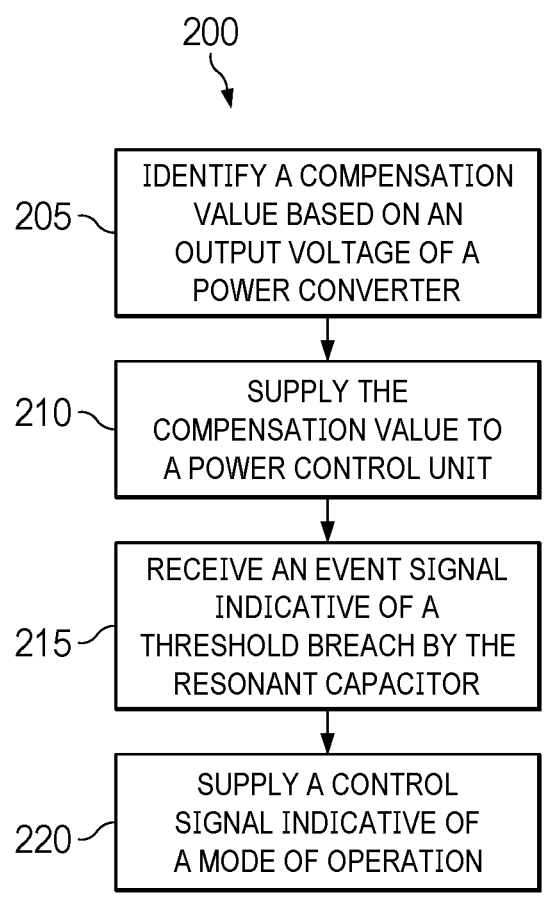
FIG. 2 illustrates a control process employed by an MCU in an implementation.
Figure 3:
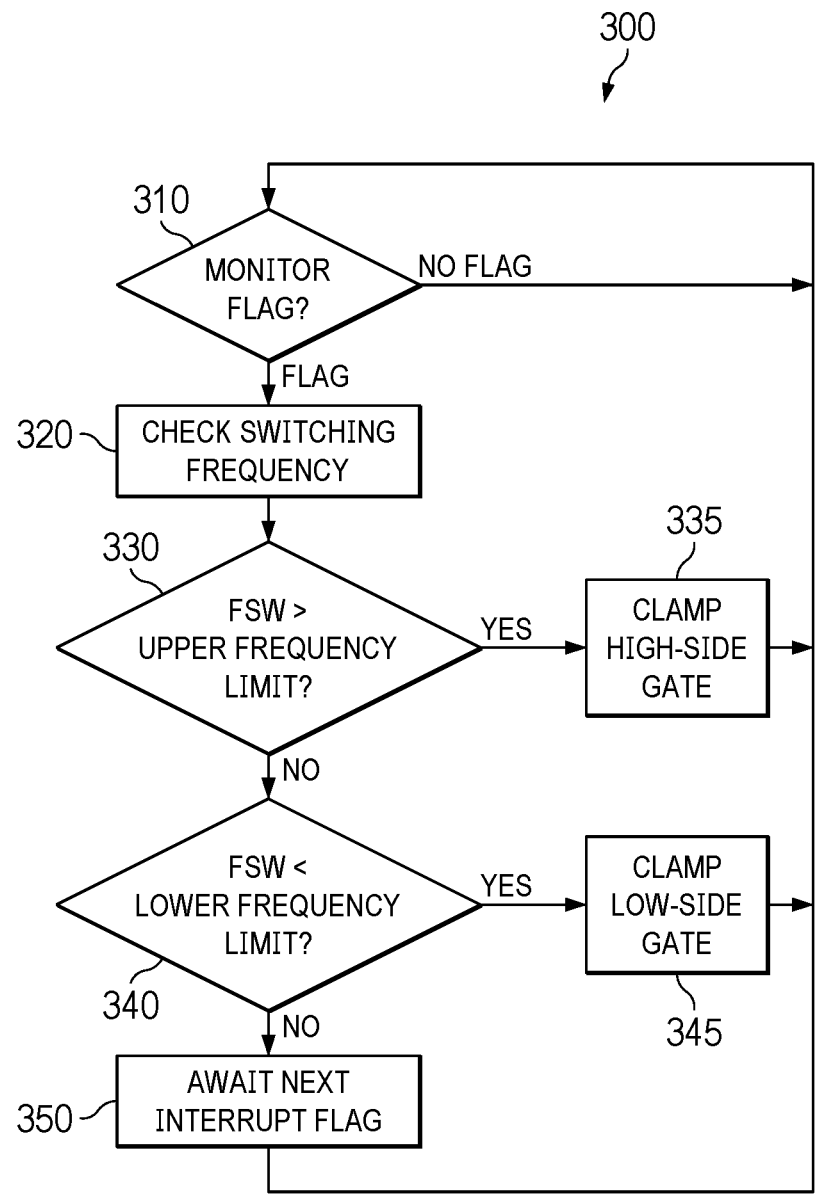
FIG. 3 illustrates an interrupt service routine employed by an MCU in an implementation.

Referring to FIG. 2, control process 200 describes a routine employed by one or more microprocessors (e.g., processing unit 135) in the context of software or firmware (e.g., control program 145) running on a MCU (e.g., MCU 105) or other such computing device. Control process 200 is implemented in program instructions stored in memory (e.g., memory sub-system 140) that, when executed by the microprocessor(s), direct the MCU to operate as follows, referring parenthetically to the steps in FIG. 2.

In operation, a processing unit of an MCU receives the output voltage of a power converter to identify a voltage compensation value (step 205). The voltage compensation value ($V_{COMP}$) is a value representative of the effects the input voltage fluctuations have on the output voltage of the power converter.

The processing unit supplies $V_{COMP}$ to a power control unit of the MCU (step 210). The power control unit derives a set of voltage thresholds based on $V_{COMP}$, including a low-side voltage threshold (VTL) and a high-side voltage threshold (VTH). The power control unit compares the voltage thresholds to a representative measurement of the real-time voltage produced by a resonant capacitor of the power converter. The result of the comparison allows the power control unit to identify breaches of VTL and VTH by the sinusoidal voltage produced by the resonant capacitor in operation. Once a breach is identified, the power control unit generates an event signal indicative of the breach.

The processing unit receives the event signal (step 215) to generate a corresponding control signal. In some examples, the generated control signal indicates a clamping mode determined by the processing unit. The processing unit supplies the control signal to the power control unit (step 220) such that the power control unit operates in accordance with the mode of operation. By designating a mode of operation of the power control unit, the power converter overall maintains a high transient response.

Referring back to FIGS. 1A and 1B, the following describes a brief example of control process 200 applied in the context of power converter 100. In operation, processing unit 135 receives $V_{out}$ 102 and proceeds to identify voltage compensation value, $V_{COMP}$ 150. $V_{COMP}$ 150 represents the effects that fluctuations of $V_{in}$ 101 had on $V_{out}$ 102.

Processing unit 135 supplies $V_{COMP}$ 150 to power control unit 130. Power control unit 130 derives a low- and high-side voltage threshold (VTL and VTH) based on $V_{COMP}$. In operation, power control unit 130 monitors $V_{CR}$ 121 as compared to the VTL and VTH to identify voltage breaches across resonant capacitor 115. Breaches of a threshold by $V_{CR}$ 121 result in the generation of event signal 160 by power control unit 130.

Processing unit 135 receives event signal 160, which indicates a threshold breach by resonant capacitor 115. Upon receiving event signal 160, processing unit 135 interrupts other processes to execute control program 145. Control program 145 directs processing unit 135 to determine the appropriate mode of operation for power control unit 130 from among a normal frequency mode, a minimum frequency clamping mode, and a maximum frequency clamping mode. If the determined mode is the normal operating mode, power control unit 130 refrains from signaling power control unit 130. However, if the determined mode is either the minimum clamping mode or the maximum clamping mode, processing unit 135 signals the determined mode to power control unit via control signal 170. Transitioning power control unit 130 into either the minimum or maximum clamping modes mitigates the potential damage caused by rapid and severe load fluctuations.

When the determined mode is the normal operating mode, processing unit 135 does not signal as such to power control unit 130. Rather, the normal operating mode is the default mode of operation for power control unit 130. In the normal (default) mode, EPWM block 155 independently generates gate command 126 and gate command 127 to adjust the switching frequencies of gate 106 and gate 107 respectively.

When control program 145 determines to transition power control unit 130 into the minimum frequency mode, processing unit 135 generates control signal 170. Control signal 170 instructs power control unit 130 to perform in the minimum frequency clamping mode. In the minimum frequency clamping mode, EPWM block 155 instructs gate driver 125 via gate command 126 to clamp gates 106 and 107 at a minimum switching frequency. In other words, in the minimum frequency clamping mode, the switching frequency of power converter circuit 103 is clamped to the minimum switching frequency.

When control program 145 determines to transition power control unit 130 into the maximum frequency clamping mode, processing unit 135 signals as such via control signal 170 to power control unit 130. In this example, control signal 170 instructs power control unit 130 to perform in the maximum frequency clamping mode. In the maximum frequency clamping mode, EPWM block 155 instructs gate driver 125 via gate command 127 to clamp gates 106 and 107 at a maximum switching frequency. In other words, in the maximum frequency clamping mode, the switching frequency of power converter circuit 103 is clamped to the maximum switching frequency.

FIG. 3 illustrates interrupt service routine 300 employed by MCU 105 in the context of a control program 145 to control the operations of a power converter circuit 103 in an implementation. Interrupt service routine 300 is implemented in program instructions stored in memory subsystem 140 that, when executed by processing unit 135, direct the MCU to operate as follows, referring parenthetically to the steps in FIG. 3.

To begin, the interrupt service routine monitors for a flag that, when present, causes the interrupt service routine to take control (step 310). The flag is set high or low in response to an event signal caused by a threshold voltage breach. For example, power control unit 130 signals to processing unit 135 that a breach occurred. Processing unit 135, under the control of control program 145, sets a flag read by interrupt service routine 300 to indicate that the breach occurred. The interrupt service routine responds to the flag by executing its own logic to determine how to respond to the breach.

The voltage breach indicated by the flag causes interrupt service routine 300 to check the switching frequency of power converter circuit 103 (step 320). Checking the switching frequency involves reading one or more counters maintained by the power control unit (e.g., counter 161 and counter 162). Counter 161 may represent, for example, a time elapsed between breaches of an upper voltage threshold by the voltage of a resonant capacitor in a power converter circuit. Similar, counter 162 may represent a time relapsed between breaches of a lower threshold voltage by the voltage of the resonant capacitor. The time elapsed between breaches corresponds to the period of the resonant capacitor, which corresponds to the period of the switching frequency of power converter circuit 103. Thus, the period between events is represents the inverse of the switching frequency and can be used to determine whether the switching frequency remains within the bounds of a defined range of frequencies.

Interrupt service routine 300 proceeds to determine whether the switching frequency (as represented by a counter) has breached an upper limit of a switching frequency range (step 330). For example, interrupt service routine 300 compares the counter value to a threshold counter value that represents the inverse of an upper limit of the defined frequency range. A counter value that is lower than the threshold counter value may indicate that the switching frequency is too high. If the switching frequency is too high, then interrupt service routine 300 proceeds to clamp the frequency at a maximum frequency (step 335).

However, if the switching frequency does not represent an upper limit breach of the frequency range, interrupt service routine 300 determines whether the switching frequency has breached a lower limit of the range (step 340). For example, interrupt service routine 300 compares the counter value to a second threshold counter value that represents the inverse of a lower limit of the defined frequency range. A counter value that is greater than the second threshold counter value may indicate that the switching frequency is too low. If so, interrupt service routine 300 proceeds to clamp the frequency at a minimum frequency (step 345).

If neither the high-side of the range nor the low-side of the range has been breached, then interrupt service routine 300 resets the interrupt flag and returns to monitoring for the interrupts (step 350).

Maximum and minimum clamping is accomplished by processing unit 135 sending a control signal to power control unit 130 that effectively overrides the power control unit's normal mode of operating. That is, when the switching frequency is within the range of switching frequencies, power control unit 130 governs the switching frequency of the low-side and gates. In contrast, when the switching frequency falls outside the range of switching frequencies, processing unit 135 effectively overrides the operations of power control unit 130. Instead, power control 130 unit holds (clamps) the switching frequency at either the maximum or minimum frequencies, depending upon the clamping mode indicated by the control signal(s) supplied by processing unit 135. In maximum frequency clamping mode, power control unit 130 clamps the switching frequency to the maximum frequency. In minimum frequency clamping mode, power control unit 130 clamps the switching frequency to the minimum frequency.

Figure 4:
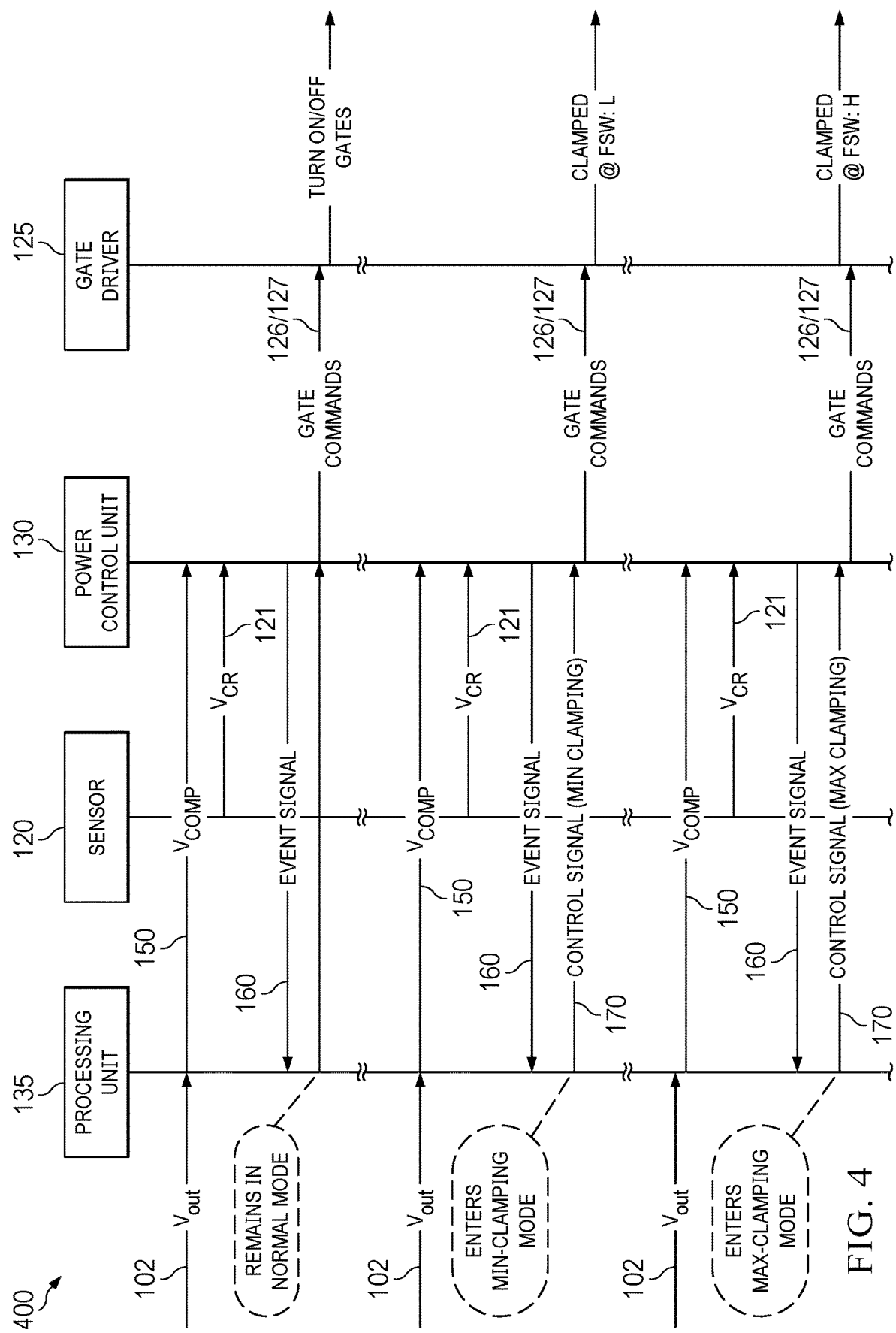
FIG. 4 illustrates an operational sequence in an implementation with respect to an HHC LLC converter.

FIG. 4 is a sequence diagram illustrating an application of control process 200 and interrupt service routine 300 in the context of power converter 100. Operational sequence 400 demonstrates how the components of an HHC LLC converter communicate or otherwise interact at run-time. Operational sequence 400 involves, but is not limited to, processing unit 135, sensor 120, power control unit 130, and gate driver 125.

In this example, processing unit 135 executes control process 200 and interrupt service routine 300 in the context of control program 145 to manage the output voltage of power converter 100 in response to input voltage fluctuations. In operation, processing unit 135 obtains $V_{out}$, a measurement representative of the output voltage produced by power converter circuit 103 in real-time. Processing unit 135 generates a voltage compensation value ($V_{COMP}$) based on the current output voltage. Processing unit 135 supplies the voltage compensation value to power control unit 130. Power control unit 130 derives voltage thresholds based on $V_{COMP}$. The voltage thresholds derived by power control unit 130 include a high-side voltage threshold (VTH) and a low-side voltage threshold (VTL) for the voltage sensed across a resonant capacitor of the HHC LLC converter.

For example, sensor 120 reads the current voltage across resonant capacitor 115 to produce $V_{CR}$, which is generally sinusoidal. Sensor 120 supplies $V_{CR}$ to power control unit 130, allowing power control unit 130 to compare $V_{CR}$ to the derived voltage thresholds. Upon detecting a breach of either VTH or VTL, power control unit 130 supplies an event signal to processing unit 135 indicative of the breach.

Processing unit 135 receives the event signals and responsively determines the switching frequency of gates 106 and 107. If the switching frequency is in the defined range, processing unit 135 remains keeps power control unit 130 in normal operating mode. In the normal operating mode, power control unit 130 continues to adjust the switching frequency of gates 106 and 107 in response to load fluctuations. Power control unit 130 implements the adjustments via gate commands send to gate driver 125. Gate driver 125 translates the commands into signals that turn the gates on and off at switching frequencies within the defined range of frequencies.

However, if the switching frequency is not within the range of switching frequencies, processing unit 135 generates a control signal that transitions power control unit 130 into one of two clamping modes: a maximum clamping mode and a minimum clamping mode. If the switching frequency has fallen below a minimum frequency, processing unit 135 instructs power control unit 130 to enter into the minimum clamping mode. In the minimum clamping mode, power control unit 130 clamps the switching frequency of gates 106 and 107 at a minimum frequency. In the minimum clamping mode, power control unit 130 sends commands to gate driver 125 at a frequency corresponding to the minimum frequency, resulting in gate driver 125 turning the gates on and off at the minimum frequency.

If the switching frequency has exceeded a maximum frequency, processing unit 135 instructs power control unit 130 to enter into the maximum clamping mode. In the maximum clamping mode, power control unit 130 clamps the switching frequency of gates 106 and 107 at a maximum frequency. In the maximum clamping mode, power control unit 130 sends commands to gate driver 125 at a frequency corresponding to the maximum frequency, resulting in gate driver 125 turning the gates on and off at the maximum allowed frequency.

Figure 6:
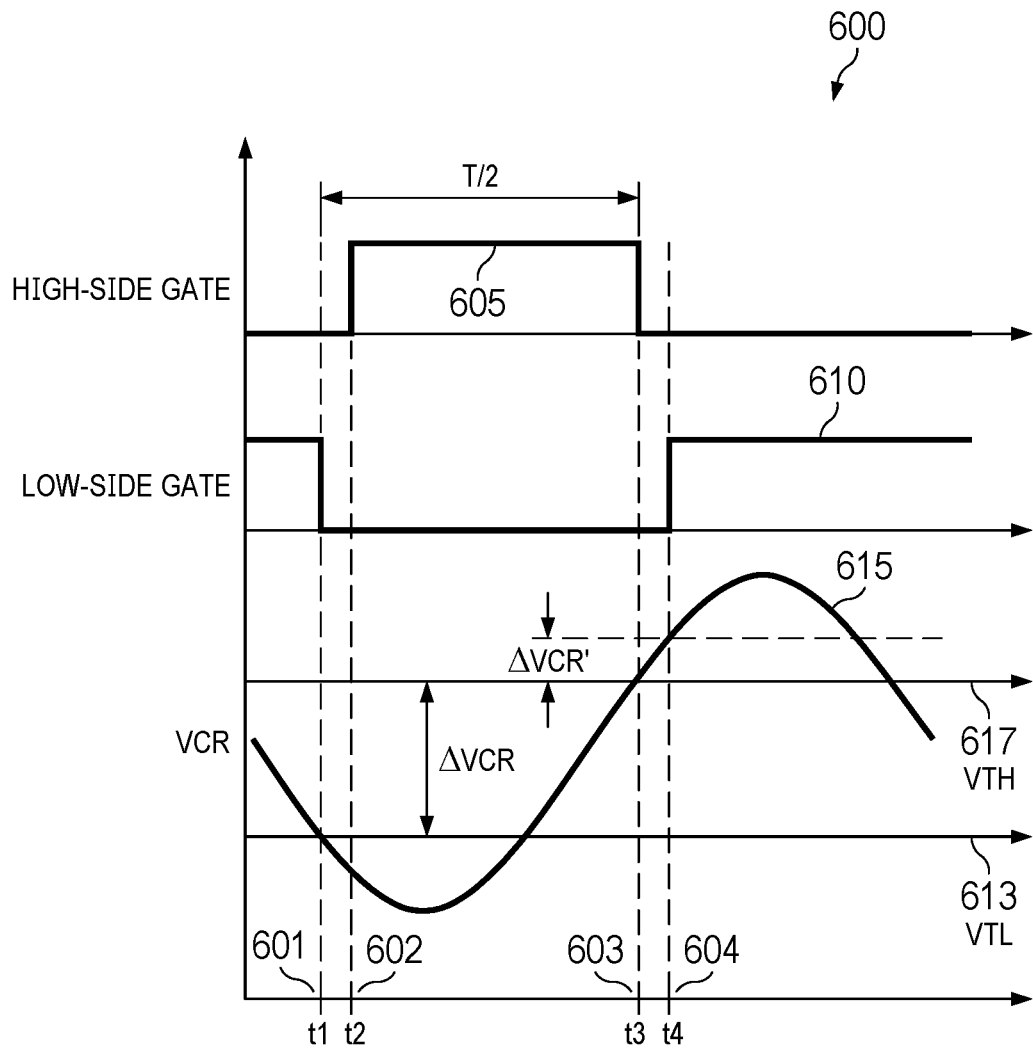
FIG. 6 illustrates a graph that describes the operating conditions of an HHC LLC converter in an implementation.

FIG. 6 illustrates timing diagram 600 describing the operating conditions for the components of FIGS. 1A and 1B with respect to the frequency range discussed above with respect to FIG. 5. Timing diagram 600 includes gate signal 605, gate signal 610, and $V_{CR}$ signal 615 (e.g., $V_{CR}$ 121). Gate signal 605 displays the state of gate 107 in operation, such that the signal depicts when the gate is either on or off. Similarly, gate signal 610 displays the state of gate 106 in operation. In turn, gate signal 605 and gate signal 610 display the switching frequency of gate 107 and gate 106 such that the switching frequency is defined as the rate at which the gates turn on and off. $V_{CR}$ signal 615 depicts voltage measurements collected over a period of time, produced by resonant capacitor 115. $V_{CR}$ signal 615 is bounded by lower voltage threshold (VTL) 613 and upper voltage threshold (VTH) 617 to identify breaches of the voltage produced by resonant capacitor 115 during runtime.

In operation, at time $t_1$ (601), $V_{CR}$ signal 615 decreases to VTL 613. In response, gate 106 is switched to logic low such that the gate is turned off, as depicted by gate signal 610. After a period of deadtime, at time $t_2$ (602) gate 107 switches to logic high such that gate signal 605 depicts this change. As $V_{CR}$ signal 615 fluctuates, at time $t_3$ (603) the signal increases to VTH 617. In response gate 107 is switched to logic low such that the gate is turned off, as shown by gate signal 605. After a period of deadtime, at time $t_4$ (604) gate 106 switches to logic high, turning the gate on, as shown by gate signal 610. In an implementation, the deadtime between $t_1$ (601) and $t_2$ (602), and the deadtime between $t_3$ (303) and $t_4$ (304) may be the same or different.

Figure 7:
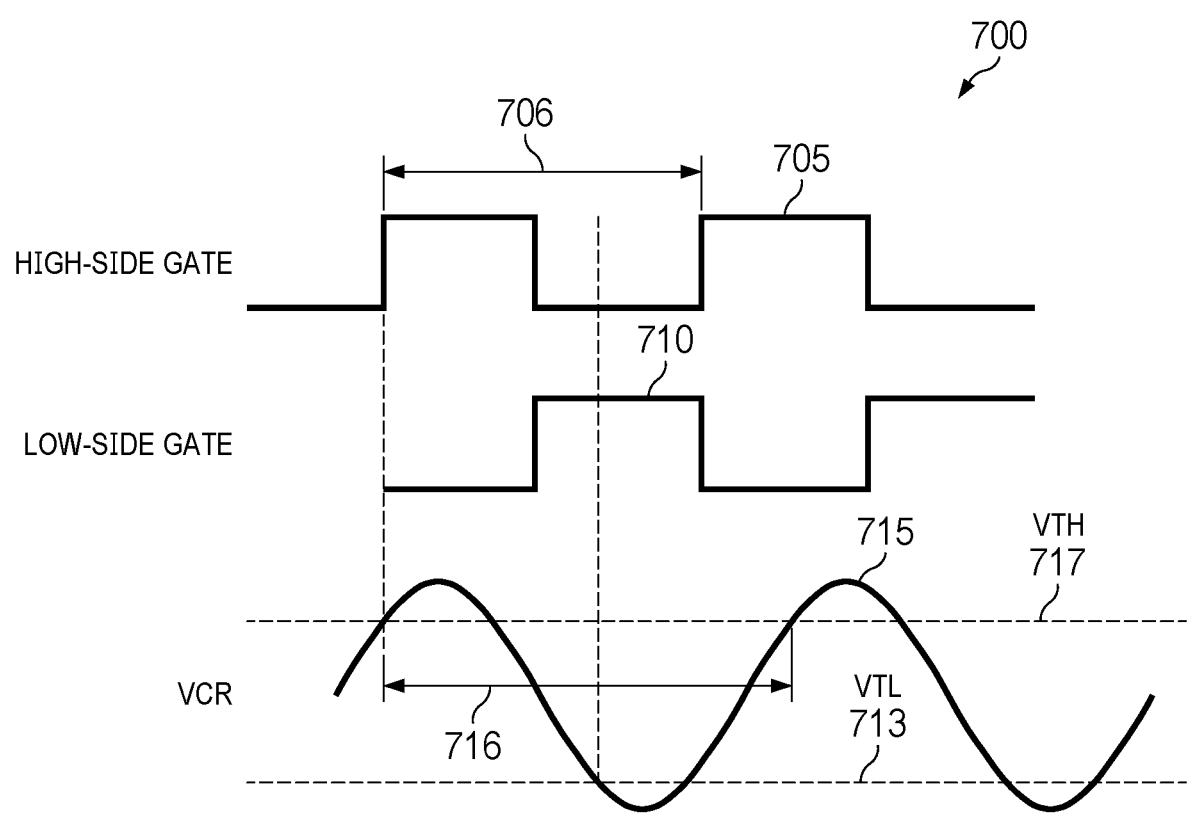
FIG. 7 illustrates a graph depicting a range of defined switching frequencies in an implementation.

FIG. 7 illustrates graph 700 describing a breach of the minimum switching frequency by the components of FIGS. 1A and 1B. Graph 700 includes gate signal 705, gate signal 710, and $V_{CR}$ signal 715 (e.g., $V_{CR}$ 121). In operation, gate signal 705 displays the minimum switching frequency allowed by gate 107, while gate signal 710 displays the minimum switching frequency allowed by gate 106. The switching frequency of the gates is defined by the rate at which the gates turn on and off such that the minimum defined switching frequency accepted by processing unit 135 is represented by period 706.

$V_{CR}$ signal 715 represents the voltage measurements produced by resonant capacitor 115 collected over a period of time. $V_{CR}$ signal 715 is bounded by lower voltage threshold (VTL) 713 and upper voltage threshold (VTH) 717 to determine if the defined switching frequency of the gates has been breached.

In operation, $V_{CR}$ signal 715 represents breaches of the range of switching frequencies when the interval between the exceeds period 706. For example, as shown in graph 700, the current interval between the breaches of VTH 717 spans period 716. As period 716 is greater than period 706, processing unit 135 can identify that the minimum switching frequency allowed by the gates has been breached and can respond appropriately.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "block," "logic," "circuit," "module," or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A system, comprising:
   one or more computer-readable storage media;
   a processing unit operatively coupled with the one or more computer-readable storage media; and
   program instructions stored on the one or more computer-readable storage media that, when executed by the processing unit, direct the processing unit to at least:
      identify, based on an output voltage produced by a power converter circuit, a compensation value used by a power control unit to derive thresholds of a resonant capacitor of the power converter circuit;
      supply the compensation value to the power control unit, wherein the power control unit controls a switching frequency of the power converter circuit based on the thresholds of the resonant capacitor derived from the compensation value;
      receive an event signal from the power control unit, the event signal indicative of a breach of one of the thresholds by the resonant capacitor;

determine that the switching frequency is outside a defined range based on the event signal; and in response to determining that the switching frequency is outside the defined range, supply a control signal instructing the power control unit to clamp the switching frequency of the power converter circuit.

2. The system of claim 1 wherein, when the switching frequency has exceeded an upper end of the defined range, the control signal instructs the power control unit to clamp the switching frequency at a maximum frequency.

3. The system of claim 2 wherein, when the switching frequency has fallen below a lower end of the defined range, the control signal instructs the power control unit to clamp the switching frequency at a minimum frequency.

4. The system of claim 1 wherein the thresholds comprise an upper voltage threshold and a lower voltage threshold, and wherein the breach occurs when a voltage of the resonant capacitor breaches either the upper voltage threshold or the lower voltage threshold.

5. The system of claim 4 wherein, to determine that the switching frequency is outside the defined range based on the event signal, the program instructions direct the processing unit to identify a counter value that represents an elapsed time between the breach and a previous breach; compare the counter value to a threshold counter value; and determine that the switching frequency is outside the defined range based on the counter value exceeding the threshold counter value.

6. The system of claim 5 wherein, to identify the counter value, the program instructions direct the processing unit to read the counter value from a register of the power control unit, wherein the power control unit increments the counter value between event signals.

7. The system of claim 6 wherein the threshold counter value corresponds to one-half of a maximum allowable period between the event signals.

8. A microcontroller comprising:
a power control unit configured to control a switching frequency of a power converter circuit based on thresholds of a resonant capacitor of the power converter circuit; and
a processing unit coupled with the power control unit and configured to at least:
receive an event signal from the power control unit indicative of a breach of one of the thresholds by the resonant capacitor;
determine that the switching frequency is outside a defined range based on the event signal; and
in response to determining that the switching frequency is outside the defined range, supply a control signal instructing the power control unit to clamp the switching frequency of the power converter circuit.

9. The microcontroller of claim 8 wherein, when the switching frequency has exceeded an upper end of the defined range, the control signal instructs the power control unit to clamp the switching frequency at a maximum frequency.

10. The microcontroller of claim 9 wherein, when the switching frequency has fallen below a lower end of the defined range, the control signal instructs the power control unit to clamp the switching frequency at a minimum frequency.

11. The microcontroller of claim 8 wherein the thresholds comprise an upper voltage threshold and a lower voltage threshold, and wherein the breach occurs when a voltage of the resonant capacitor breaches either the upper voltage threshold or the lower voltage threshold.

12. The microcontroller of claim 11 wherein, to determine that the switching frequency is outside the defined range based on the event signal, the processing unit is configured to:
determine an elapsed time between the event signal and a previous event signal,
compare the elapsed time to a threshold amount of time; and
determine that the switching frequency is outside the defined range based on the elapsed time exceeding the threshold amount of time.

13. The microcontroller of claim 12 wherein, to determine the elapsed time between the event signal and the previous event signal, the processing unit is configured to read a counter in a register of the power control unit, wherein the power control unit increments the counter between event signals.

14. The microcontroller of claim 8 wherein the processing unit is further configured to identify a compensation value based on an output voltage produced by the power converter circuit and supply the compensation value to the power control unit, wherein the power control unit is further configured to derive the thresholds of the resonant capacitor based on the compensation value.

15. A method of operating a microcontroller to control an output voltage produced by a power converter circuit, wherein the microcontroller comprises a power control unit and a processing unit, and wherein the method comprises:
in the power control unit:
adjusting a switching frequency of the power converter circuit based on thresholds of a resonant capacitor of the power converter circuit; and
generating event signals indicative of breaches of the thresholds by the resonant capacitor; and
in the processing unit:
receiving an event signal from the power control unit indicative of a breach of one of the thresholds by the resonant capacitor;
determining that the switching frequency falls outside a defined range based on the event signal; and
in response to determining that the switching frequency falls outside the defined range, instructing the power control unit to clamp the switching frequency of the power converter circuit.

16. The method of claim 15 further comprising, when the switching frequency has exceeded an upper end of the defined range, the power control unit clamping the switching frequency at a maximum frequency.

17. The method of claim 16 further comprising, when the switching frequency has fallen below a lower end of the defined range, the power control unit clamping the switching frequency at a minimum frequency.

18. The method of claim 15 wherein the thresholds comprise an upper voltage threshold and a lower voltage threshold, and wherein the breach occurs when a voltage of the resonant capacitor breaches either the upper voltage threshold or the lower voltage threshold.

19. The method of claim 18 wherein determining that the switching frequency is outside the defined range based on the event signal comprises the processing unit:
determining an elapsed time between the event signal and a previous event signal;
comparing the elapsed time to a threshold amount of time; and
determining that the switching frequency is outside the defined range if the elapsed time exceeds the threshold amount of time.

20. The method of claim 19 wherein determining the elapsed time between the event signal and the previous event signal comprises the processing unit reading a counter in a register of the power control unit, wherein the power control unit increments the counter between event signals.

* * * * *